Patented Sept. 22, 1936

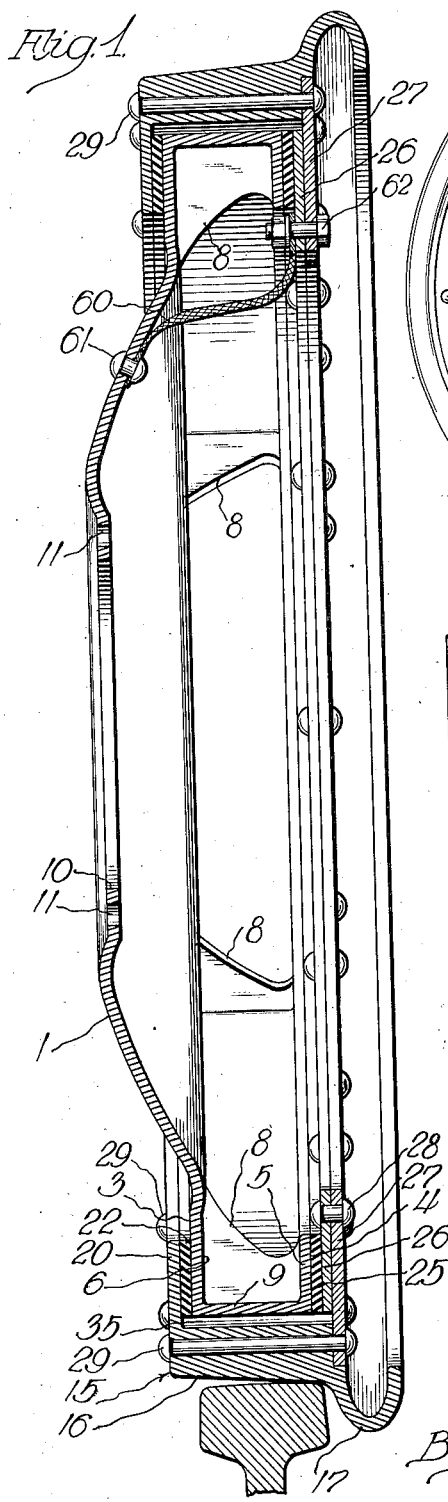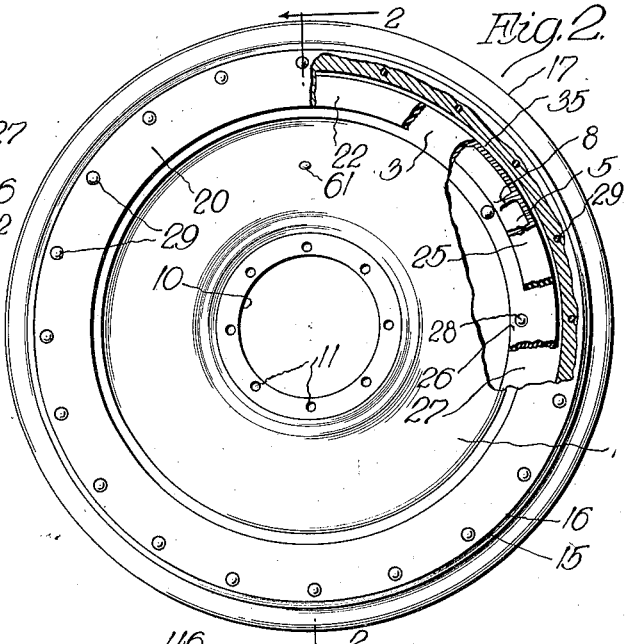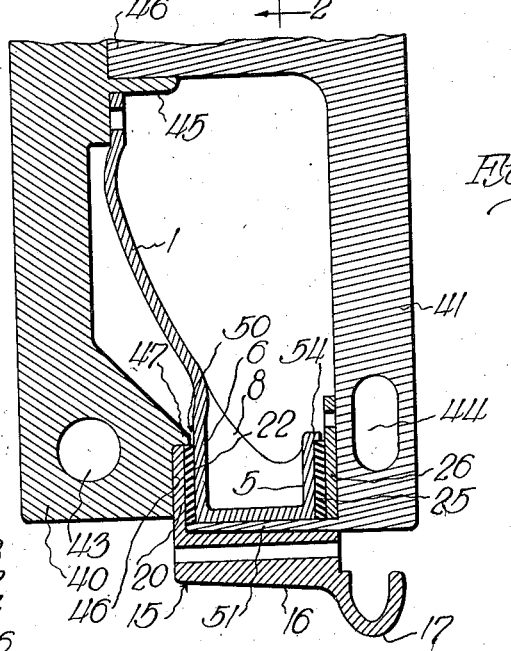

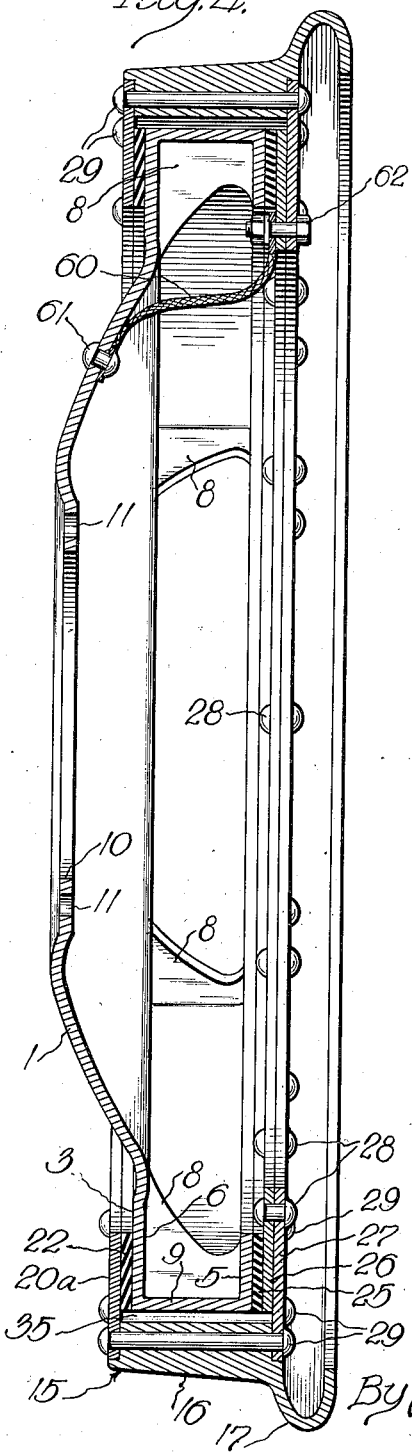
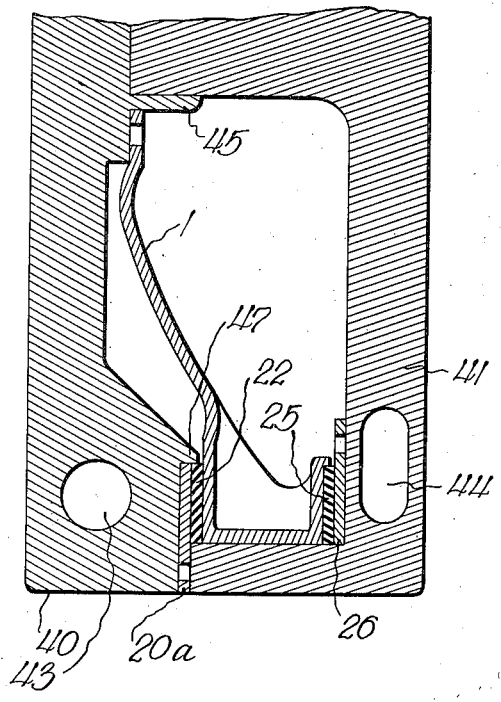

2,054,803

UNITED STATES PATENT OFFICE 2,054,803

WHEEL

Robert J. Burrows and Alfred O. Williams, Battle Creek, Mich., assignors to Clark Tructractor Company, Battle Creek, Mich., a corporation of Michigan Application September 22, 1932, Serial No. 634,304

5 Claims. (Cl. 295—11)

The present invention relates generally to wheels and is particularly concerned with wheels of the type wherein the rim is separated from the central wheel body by cushioning material of any flexible or resilient nature by which road shocks are absorbed and are not transmitted to the wheel axle or the vehicle supported thereby. One of the materials usually employed in this connection is rubber, and many attempts have been made to insert rubber between the outer part of a wheel and the hub or spider to secure a resilient action for the purpose of absorbing shocks. Generally, such wheels have employed rubber under compression, but such wheels have not proven satisfactory and one of the disadvantages is that when rubber is used in compression the only section of the resilient material which is actually useful in absorbing road shocks at any one instant is the section at or adjacent the portion of the wheel which is for an instant in contact with the ground or other supporting surface. It is now believed that the most efficient manner of employing rubber to accomplish resiliency, together with long life, is to have the rubber work in shear.

Proceeding according to this theory, the present invention provides a cushioned wheel wherein rubber is employed as the cushioning material and is so disposed as to support all radial loads imposed on the wheel by the strength of the rubber in shear. Briefly, this has been accomplished by the provision of one or more rubber discs or rings bonded, as by vulcanizing, between the side faces of the wheel body and the rim member, the latter parts being provided with suitable surfaces disposed parallel with respect to the general plane of the wheel and to which the rubber is securely vulcanized or otherwise bonded thereto.

Another object of the present invention is to provide a cushioned wheel wherein the cushioning material is disposed adjacent the periphery of the wheel and is uniformly loaded or stressed throughout the entire circumferential extent thereof whenever any radial load is imposed upon the wheel. This result, as is obvious, cannot be accomplished by any method of using resilient material, such as rubber, under compression. However, when the cushioning material is stressed in shear only, each section of the cushioning material is subjected to exactly the same loading, and this circumferential uniformity is complete entirely around the wheel.

A further object of the present invention is to arrange the cushioning material so that, not only is the cushioning material uniformly loaded throughout its length to secure effective cushioning in the plane of the wheel, but also the cushioning material is so arranged as to provide for absorbing shocks imposed upon the wheel laterally as well as radially. For example, where the wheel constructed according to the principles of the present invention is a rail car wheel, the cushioning material works in shear to absorb the shocks due to defective rail joints and the equivalent and, in addition, the rubber or other cushioning material is enabled by virtue of being subjected to compression, to take care of lateral thrusts, such as those due to impact between the wheel flange and the rail.

Another feature of importance exhibited by the present invention is one relating to safety, an essential the necessity of which is generally recognized. Where the cushioning material is employed in shear in a railroad car wheel or the like and can be secured by bonding in any known manner to laterally spaced flanges of the equivalent, the rim portion proper of the wheel can be brought quite closely to the radially outer or peripheral portions of the wheel body, the only necessity present being that sufficient space must be provided to take care of the relative movement between the wheel body and the rim portion. In actual practice this required spacing is relatively small so that even should the rubber or other cushioning material entirely fail, the wheel body would merely ride inside the rim without dropping any appreciable distance or without tending to derail the car.

Another object of the present invention, while relating to wheels of the type outlined above, is more particularly concerned with the formation thereof especially the manner in which the cushioning material is bonded, as by vulcanizing or the like, to the rim and to the wheel body. Preferably, the cushioning material takes the form of rubber rings or discs which are flat and which have their lateral faces securely bonded or vulcanized to the rim flanges and the adjacent surfaces of the wheel body. Where vulcanizing is employed, both pressure and heat are necessary, and it is also necessary to confine the radially inner and outer edges of the rubber rings to confine the latter when pressure is applied to the rim and wheel body. During this step in the manufacture of the wheels, use is made of the space between the peripheral edge of the wheel body and the radially outwardly spaced portion of the rim to provide for the insertion of a cylindrical extension or portion of the associated die, such extended portion serving to prevent the radially outward flow of the cushioning material when heat and pressure are applied. After the vulcanization of the cushioning material has been completed and the dies withdrawn the attachment of the rim to the wheel body may be completed by any suitable form of assembly plate which may be riveted to one side of the rim and to the flange ring or key ring which was bonded during the vulcanization process to the cushioning material.

These and other objects of the present invention will be apparent to those skilled in the art after a consideration of the following detailed description of the preferred structural embodiment, taken in conjunction with the accompanying drawings, in which:

Figure 1 is a vertical section taken through the axis of a wheel constructed according to the principles of the present invention;

Figure 2 is a side elevation of the wheel shown in Figure 1, certain parts being broken away to better illustrate the construction;

Figure 3 illustrates the position and arrangement of the vulcanizing dies employed in vulcanizing the rubber cushioning rings in the wheel shown in Figure 1;

Figure 4 illustrates a modified form of wheel employing a construction in which the rim of the wheel may not be in place during the vulcanizing operation; and Figure 5 illustrates the position and arrangement of the vulcanizing dies which may be employed in making the wheel shown in Figure 4.

Referring now to the drawings, the reference numeral 1 indicates a central wheel body in the form of a dished disc or spider terminating at its periphery in a pair of axially spaced planar circumferential portions 3 and 4 annularly arranged to receive flat bands of rings of rubber or other resilient cushioning material. The surface 4 is formed on a reentrant edge or flange 5 which is connected with the flanged portion 6 of the wheel body 1 by reenforcing ribs 8 and a peripheral web 9. The central portion of the wheel body 1 is provided with an opening 10 and a plurality of circumscribing holes 11 to receive and be secured to any conventional form of axle and hub means.

The rim or tire of the wheel is indicated by the reference numeral 15, and in the illustrated construction it will be seen that the rim shown is of the form used for rail cars and the like having the usual beveled tread surface 16 and a rail flange 17. The rim 15 also carries a radially inwardly extending flange ring 20 which, in Figure 1, is formed integrally with the rim 15. The flange ring 20 lies in a plane parallel with respect to the general plane of the wheel and is spaced a short distance from the planar surface 3 formed on the laterally outer side of the wheel body 1. A relatively flat band or ring of elastic resilient material, such as rubber or the like, is interposed between the planar surface 3 and the inner planar surface of the flange ring 20 and securely bonded thereto as by vulcanizing or the like, as will be later explained in detail. The cushioning material is indicated in Figure 1 by the reference numeral 22.

A second band or strip of cushioning material 25 is bonded to the opposite surface 4 and to a second ring member 26. The ring 26, unlike the flange ring member 20, is formed separately from the rim 15 but is secured thereto through the medium of an assembly ring 27 which is riveted, as by rivets 28, to the radially inner edge of the ring member 26 and to the rim 15 opposite the flange ring 20 by relatively long transverse rivets 29. As will be apparent from Figure 1, the assembly ring 27 extends radially outwardly of the wheel body a greater distance than does the ring member 26 in order to provide for attaching the assembly ring to the rim 15.

It will be noted that the rim 15 encircles or embraces the peripheral edge 9 of the wheel body 1 but is spaced therefrom a small distance, providing an annular circumferential air space 35 between the rim and the edge of the wheel body. This space is important in that relative movement in a radial direction between the wheel body 1 and the rim 15 is provided for, the elasticity and resiliency of the cushioning strips 22 and 25 permitting such relative movement.

It will also be observed that the cushioning material 22 and 25 is disposed in planes parallel with respect to the general plane of the wheel and that this material is bonded to the wheel body and to the flange rings or to the rim along annular junction areas which also lie in planes parallel with respect to the general plane of the wheel. By virtue of this construction all radial loads are supported by the rubber inserts acting in shear only. It will also be observed, particularly from Figure 2, that the loading of the cushioning strips in shear is uniform and is continuous entirely around the wheel. That is to say, should the wheel be called upon to support such weight as would cause the wheel body to shift vertically an amount equal to, say, $\frac{1}{16}$ of an inch, every section of the resilient material throughout the circumference of the wheel will be subjected to a shear corresponding to a shift of $\frac{1}{16}$ of an inch of one surface relative to the opposite surface. This uniform and extensive distribution of the shear loading is considered an important feature of the present invention, particularly when contrasted with prior constructions in which the cushioning material is employed in compression, in which case the relatively small amount of material at the bottom of the wheel where the latter contacts with the ground was required to support the entire load imposed upon the wheel, leaving by far the greater portion of the mass of cushioning material unused at any one instant. In the present invention, instead of being confined to a relatively small section of the cushioning material, the loads thereon are distributed entirely around the entire extent of the cushioning strips. It is also desired to point out that cushioning material such as rubber and the like has a longer life and greater resiliency where it is stressed in shear only.

The flange members or rings 20 and 26, carried by or otherwise securely attached to the wheel rim are disposed on the laterally outer sides of the wheel with respect to the general plane thereof while the tread section 16 of the rim encircles the peripheral edge 9 of the wheel body. Thus, the entire periphery of the wheel body is embraced by the rim, being spaced therefrom both axially and radially to provide for the relative movement therebetween occurring during the cushioning action of the rubber bands or strips. The latter, as is obvious, serve to space the rim axially of the wheel body and to secure the same in position while the annular air space 35 provides for relative movement between the wheel body and the rim in a radial direction. By virtue of this construction, therefore, even if the cushioning rubber rings 22—25 fail, no disastrous results would follow because the wheel body would merely drop down and the peripheral edge 9 thereof would simply ride around the inside of the rim 15, the members 20 and 26 preventing the rim 15 from becoming detached.

Reference was made above to the provision of the cushioning material so that it works in shear only when the wheel is subjected to radial loads. For example, the entire weight imposed upon the wheel is supported by the strength of the entire mass of cushioning material in shear. The same is also true of impact and other loads imposed upon the wheel by defective rail joints and the like or by irregularities in the supporting surface over which the wheel operates. The cushioning material 22 and 25, while normally resisting loads by its shearing strength only, is nevertheless available to provide an amount of cushioning transversely of the wheel to take care of the impact between the wheel flange 17 and the rail or switches or the like or other transverse stresses. Thus, side thrusts imposed upon the vehicle are cushioned by virtue of the cushioning material 22—25 being momentarily subjected to compression whenever the wheel body 1 and the rim 15 are subjected to forces tending to shift them relative to one another laterally of the wheel.

Figure 3 illustrates the pressure dies or molds used in vulcanizing the rubber cushioning material in place between the wheel body and the flange rings of the rim. The dies are indicated by the reference numerals 40 and 41, and each is provided with cored passageways 43 and 44 to conduct the steam used in heating the dies. Obviously, instead of steam, any other form of heating means may be employed. The die member 40 includes a central portion 45 which is formed interiorly to receive an extension 46 of the companion die member 41, the exterior portion of the boss 45 serving as a locating flange of cylindrical formation to receive the opening 10 of the wheel body whereby the latter is brought to and maintained in the proper position in the dies. The die 40 is provided with a groove 46 to receive the flange ring 20, and disposed radially inwardly of the groove 46 in a shouldered portion 47 which height is slightly less than the thickness of the flange ring 20 and the associated rubber cushioning material 22 so that a small passageway 50 is provided for the escape of excess rubber during the vulcanizing operation.

The companion die 41 is provided with a cylindrical skirt portion 51 which is so dimensioned as to enter the space 35 and to contact with the inner surface of the flange ring 20. The diameter of the skirt portion 51 is substantially the same as the outer diameter of the wheel body. The skirt 51 therefore serves to prevent the escape of rubber from between the surface on the rim and wheel body to which it is to be vulcanized. If it were not for the skirt portion 51 the proper pressure could not be applied by the dies 40 and 41. Preferably, the flange 5 on the wheel body is initially formed with an outturned shoulder 54 which during the vulcanizing operation performs the same function as the shoulder 47, namely, to provide for the escape of excess rubber while yet holding the general mass of unvulcanized rubber in place under pressure during the vulcanizing process. This shoulder 54 may be later removed if desired, and it is so indicated in Figure 1.

During the vulcanizing process pressure heat is applied to the dies 40 and 41, as is well known in the art, as a result of which the rubber cushioning material is securely bonded to the wheel body and to the associated members 20 and 26. After vulcanization has been completed, the dies 40 and 41 are removed, and then the assembly ring 27 is securely riveted to the ring member 26 and rim 15, forming the completed wheel shown in Figure 1.

In order to operate conventional signal circuits and the like, it is necessary to electrically connect the rim section 15 with the wheel body section 1, and preferably this is accomplished as indicated in Figure 1 by some form of conductor, such as a flexible copper wire 60. One end of the wire 60 is riveted to the wheel body, as by a rivet 61, while the other end is bolted to the flange ring 26 or the assembly ring 27 or both by bolt means 62. Obviously, any other form of securing means may be employed where it is desired.

Figure 4 illustrates a construction wherein the flange ring 20 is not formed integrally with the rim 15 but is formed separately therefrom and riveted thereto at the same time the assembly ring 27 is riveted to the rim. Under some conditions this construction may be preferred, principally because it is not necessary to have the rim proper in position during the vulcanizing process, as indicated in Figure 5. From Figures 4 and 5 it will be observed that the flange ring 20a is formed to extend radially outwardly of the cushioning band 22 while the flange ring 26 extends radially inwardly. Thus, during the vulcanization process, it is not necessary that the die 41 be provided with a relatively thin skirt, such as the one indicated by the reference numeral 51 in Figure 3, but this portion of the die 41 as shown in Figure 5 may be made thicker and heavier. Thus, the die 41 can be more rugged and its removal from the wheel after the vulcanizing process has been completed is somewhat facilitated. Also, the wheel, not having the rim 15 in place, is lighter in weight and therefore somewhat easier handled. After the vulcanizing process has been completed, as in Figure 5, the rim 15 and the assembly ring 27 may be secured in place and attached to the rings 20a and 26 by the rivets 28 and the rivets 29 which in Figure 1 secured only the assembly ring 27 to the rim 15.

While we have described above and illustrated in the drawings the preferred embodiment of the present invention, it will be apparent to those skilled in the art that our invention is not to be limited to the specific forms shown and described but that, in fact, widely different means may be employed in the practice of the broader aspects of our invention. For example, the principles of the present invention are equally applicable to automobile wheels and other vehicle wheels of various kinds.

What we claim, therefore, and desire to secure by Letters Patent is:

1. A wheel comprising a central wheel body having a peripheral portion providing a pair of laterally spaced planar portions lying in planes generally parallel to the plane of the wheel body, a continuous annular band of rubber having a diameter substantially equal to the diameter of the wheel and bonded on each of the outer faces of said planar surfaces, a rim member embracing the wheel body and spaced radially a short distance from the peripheral portion of said wheel body, a flange carried by and formed integrally with said rim member and disposed outside one of said rubber bands and bonded to the outer face of the latter, a ring member disposed adjacent the other rubber band and bonded to the outer face of the latter, and an assembly ring adapted to be secured to said ring member and said rim member to prevent axial separation of the rim and wheel body.

2. A wheel comprising a central wheel body having a peripheral portion providing a pair of laterally spaced planar sections lying in planes generally parallel to the plane of the wheel body, a continuous annular band of rubber having a diameter substantially equal to the diameter of the wheel and bonded on each of the outer faces of said planar surfaces, a rim member embracing the wheel body and spaced radially a short distance from the peripheral portion of said wheel body, a flange carried by said rim member and disposed outside one of said rubber bands and bonded to the outer face of the latter, a ring disposed adjacent the other rubber band and bonded to the outer face of the latter, and an assembly ring adapted to be secured to said ring and said rim member to prevent axial separation of the rim and wheel body.

3. A wheel comprising a central wheel body having a peripheral portion providing a pair of laterally spaced planar portions lying in planes generally parallel to the plane of the wheel body, a continuous annular band of rubber having a diameter substantially equal to the diameter of the wheel and disposed on each of the outer faces of said planar surfaces, a rim member embracing the wheel body and spaced radially a short distance from the peripheral portion of said wheel body, a flange carried by said rim member and disposed outside one of said rubber bands, a ring member disposed adjacent the other rubber band against the outer face of the latter, and an assembly ring adapted to be secured to said ring member and said rim member to prevent axial separation of the rim and wheel body.

4. A wheel comprising a central wheel body having a peripheral portion provided with a pair of axially spaced flange portions having planar surfaces facing laterally with respect to the general plane of the wheel body, a rim member carrying planar sections projecting radially inwardly from the lateral edges thereof and embracing the periphery of said wheel body and spaced laterally with respect to said planar surfaces, and resilient cushioning rings secured between said surfaces and said planar members.

5. A resilient wheel comprising a wheel body with a radially directed circumferential channel, a rim member having a radially inwardly directed planar flange at one lateral edge, a planar disk member adapted to be secured to the opposite lateral edge of the rim member, and resilient members compressed between the external lateral surfaces of said channel and the inner lateral surfaces of said flange and disk member.

ROBERT J. BURROWS.
ALFRED O. WILLIAMS.